United States Patent
Kim et al.

(10) Patent No.: US 6,918,074 B2
(45) Date of Patent: Jul. 12, 2005

(54) AT SPEED TESTING ASYNCHRONOUS SIGNALS

(75) Inventors: Kee Sup Kim, Folsom, CA (US); Shyang-Tai Sean Su, Folsom, CA (US); Adarsh Kalliat, Kerala (IN); Ajith Prasad, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 550 days.

(21) Appl. No.: 10/187,474

(22) Filed: Jun. 28, 2002

(65) Prior Publication Data

US 2004/0003332 A1 Jan. 1, 2004

(51) Int. Cl.[7] ............... G01R 31/3177; G01R 31/3187; G01R 31/3193
(52) U.S. Cl. ...................................... 714/733; 714/726
(58) Field of Search ................................. 714/726, 733

(56) References Cited

U.S. PATENT DOCUMENTS

| | | | |
|---|---|---|---|
| 4,377,757 A | * | 3/1983 | Konemann et al. ............ 326/16 |
| 5,247,525 A | * | 9/1993 | Taira et al. ................. 714/732 |
| 5,412,665 A | * | 5/1995 | Gruodis et al. ............. 714/739 |
| 6,738,939 B2 | * | 5/2004 | Udawatta et al. ........... 714/726 |
| 2002/0059547 A1 | * | 5/2002 | Nozuyama ................... 714/738 |
| 2004/0003330 A1 | * | 1/2004 | Block et al. ................. 714/726 |

OTHER PUBLICATIONS

Dong, Dr. Liang; ASIC TEST; Western Michigan University; Fall 2004 URL: http://homepages.wmich.edu/~ldong/teaching/ASIC_TEST.pdf.*
Anon.; Simulation, Verification and Testing; URL: http://www.cems.uwe.ac.uk/~ngunton/vhdl/simulation.emb.pdf.*
Konemann, B.; Zwiehoff, G.; Mucha, J.; Built–in test for complex digital integrated circuits; Solid–State Circuits, IEEE Journal of,vol.: 15, Issue: 3, Jun. 1980; pp.: 315–319.*
Avra, L.J.; McCluskey, E.J.; Synthesizing for scan dependence in built–in self–testable designs; Test Conference, 1993. Proceedings., International, Oct. 17–21, 1993; pp.: 734–743.*

* cited by examiner

*Primary Examiner*—R. Stephen Dildine
(74) *Attorney, Agent, or Firm*—Blakely, Sokoloff, Taylor & Zafman LLP

(57) ABSTRACT

A testing device uses an input signature register to conduct "at speed" testing of asynchronous circuit responses in an effort to determine the operability of a monitored circuit. Upon receiving an enable signal, the input signature register quickly measures, compresses, and transmits the tested circuit responses so that the responses can be compared with a set of anticipated responses to determine whether the circuit is functioning properly. The enabled input signature register, such as a MISR or a SISR, generates an output signature, which contains the compressed responses of the monitored circuit and helps the testing device analyze circuit performance.

35 Claims, 8 Drawing Sheets

AT SPEED TESTING ASYNCHRONOUS SIGNALS

TECHNICAL FIELD

Embodiments of the invention relate to improving operational and performance tests conducted on a chipset or circuit, such as an integrated circuit. More particularly, specific embodiments of the invention relate to the architecture and operation of "at speed" testing of devices for asynchronous signals.

BACKGROUND

As with any manufacturing industry, production testing is very useful in determining the quality and reliability of a product. Discovering faulty integrated circuit (IC) components early in the production stage is very important, because the cost of finding and replacing the bad component dramatically increases with each level of integration. For example, the cost of replacing a faulty IC is less than replacing a printed circuit board using the faulty IC, which is less expensive than replacing an entire computer system that incorporates the faulty IC.

Unfortunately in the semiconductor industry, accurate production testing of all the components included on an integrated circuit (IC) is very difficult. The basic principle behind production testing is to provide the stimulus to activate and to propagate faults in the circuit being tested. A successful production test should be able to apply, test, measure, and compare the circuit responses with a set of expected responses to determine whether the circuit is functioning properly. Exemplary types of testing include exhaustive testing and functional testing. Exhaustive testing provides every possible combination of stimulus, for example an electronic device with 16 input ports and no internal memory would have $2^{16}$ or 65,536 test vectors. In contrast to exhaustive testing, a functional test uses fewer test vectors, but requires designer expertise to determine which vectors will still provide exhaustive testing of the circuit.

Regardless of which type of stimulus is used, the testing device must be able to capture the relevant outputs. Traditionally, the testing device is programmed to start comparing observed data signal values with expected signal values after a defined latency period associated with the electronic device being tested. Predicting when valid output data will be available relative to when the test vector was applied to the device being tested is not always possible, especially in electronic devices that use multiple clock domains, such as chipsets and network switches. This presents a substantial logistical obstacle during production testing of these electronic devices, since standard testing devices require outputs to be available after a specified number of cycles. To compensate, some testing devices employ a lockstep loop test method. Unfortunately, this method is an impractical approach when there are also multiple data channels on the electronic device being tested.

For example, when a test data packet is sent in functional testing mode through a network switch starting on clock cycle 0, the resulting data packet may not arrive on the data output path until several cycles later (e.g., clock cycles 10, 11, or 12). The exact timing surrounding when the data packet arrives depends on a variety of factors including how the multiple clock domains within the network switch interact during a particular test run. As a result, the same electronic device may produce valid outputs after a variety of clock cycles (10, 11, or 12), even though the test conditions are similar. These signals exhibiting an uncertain response time will be called asynchronous data signals for the purpose of this document.

Furthermore, the lockstep loop method and other similar testing methods often alter or freeze the overall timing of the electronic device so that the signals can be read externally. Unfortunately, production tests which are applied at slow clock speeds miss many defects that only appear as speed-sensitive defects. Speed-sensitive defects are costly, because the electronic device appears to function properly at very slow clock speeds, but fails at the designed operating speed. The result is that the electronic device, such as a chipset or network switch, may initially pass a slow test during production testing only to fail when operating at speed after being installed in a product. As previously discussed, the economic cost of replacing a defective installed electronic device far exceeds the actual cost of component replacement.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
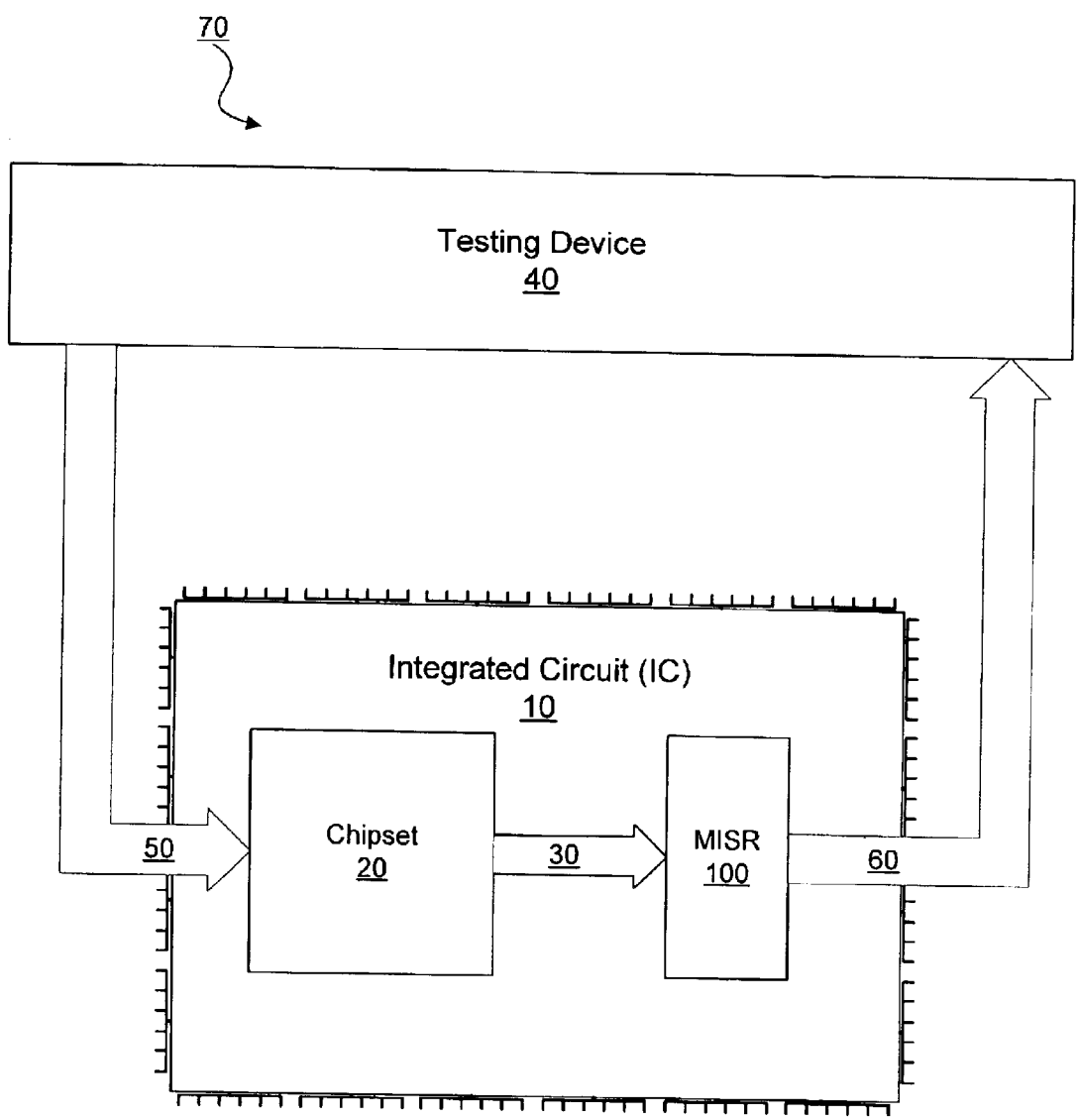
FIG. 1 illustrates one embodiment of a suitable testing environment.

A system and apparatus providing at speed testing of asynchronous signals is described. At speed testing is necessary for properly determining the operability of the monitored circuit as illustrated in FIG. 1. Various embodiments of the invention can be applied to an apparatus, system or architecture that uses a built-in self-test (BIST) application for asynchronous signals. Upon receiving an enable signal, embodiments of the invention quickly measure, compress, and transmit the tested circuit responses so that the responses can be compared with a set of anticipated responses to determine whether the circuit is functioning properly. More specifically, the input signature register receives valid asynchronous data signals from the monitored circuit and conveys the resulting operational signatures via a data output path to a testing device.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 2:
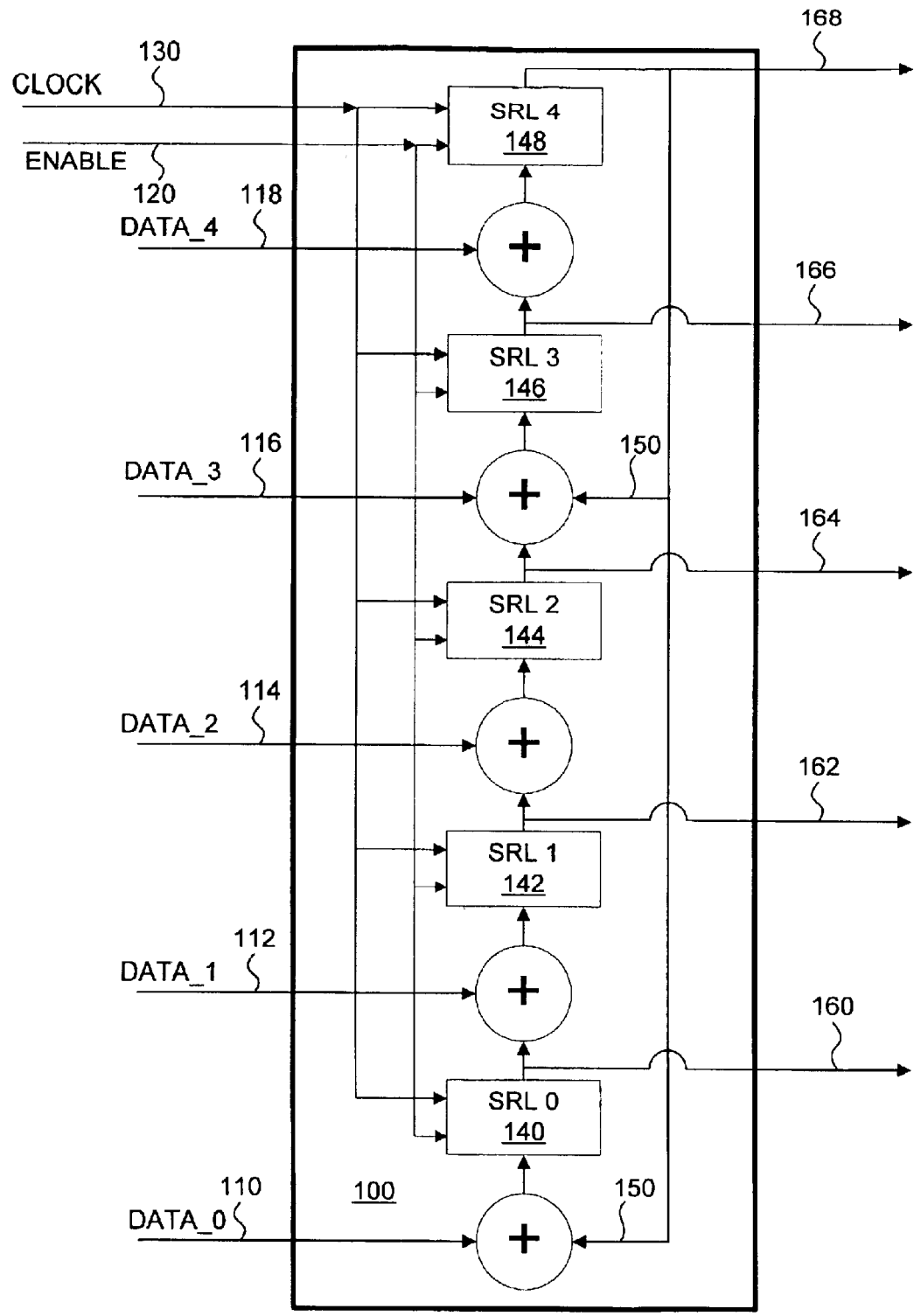
FIG. 2 is a schematic block diagram of one embodiment of an exemplary multiple-input signature register (MISR)
Figure 3:
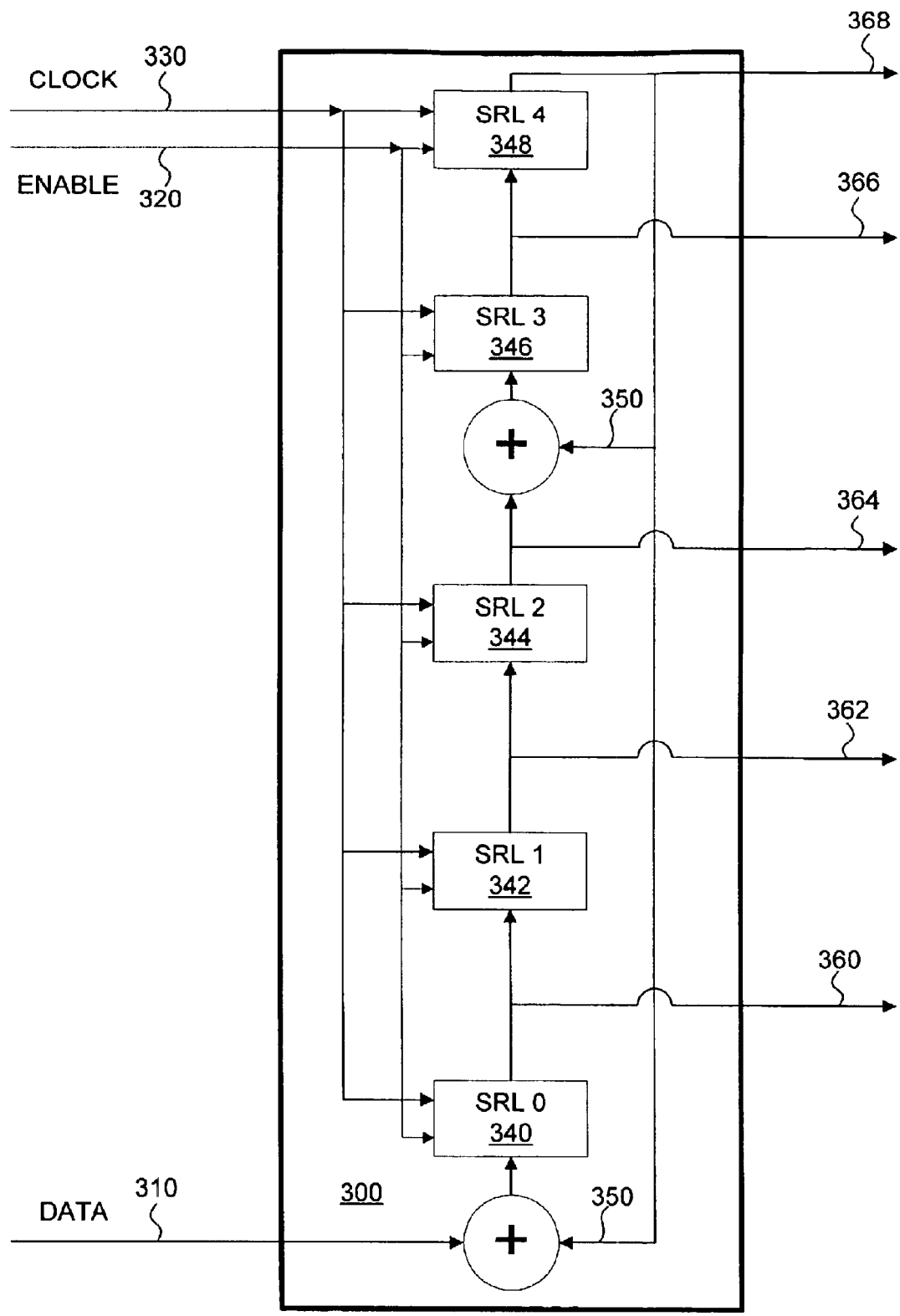
FIG. 3 is a schematic block diagram of one embodiment of an exemplary single-input signature register (SISR)

Input signature register (ISR), as that term is used herein, refers to the combination of hardware often used in built-in self-test applications to capture circuit responses. During a typical self-test application, a stimulus, such as a pseudo-random signal, is applied to the monitored circuit to determine whether the monitored circuit is functioning correctly. A time period of signal uncertainty is associated with the application of the stimulus to the circuit. During this time period of uncertainty signals received at the output may or may not be valid circuit response to the stimulus. The uncertainty is attributable to the variable length of time needed by the circuit being tested to process the stimulus. The uncertainty period can be the result of interaction between clock domains, responses of multiple data channels, and other similar time-sensitive design features. Embodiments of the present invention transmit a valid data signal or enable signal along with the leading edge of valid data to reduce the uncertainty associated with the circuit responses. Generally, the first asynchronous signal responses of the circuit will begin to arrive during the period of uncertainty, but can be validated if accompanied by the enable signal. The ISR receives and compresses the resulting circuit responses into signature registers. As a result of the circuit responses, the ISR generates a bit pattern or signature, which can be compared to known good signatures for the circuit. The signature is generally based on circuit information and may include several distinct yet valid configurations. Typically, the ISR compresses the sampled circuit responses via a characteristic signature or primitive polynomial embedded in the signature registers. Two exemplary ISR embodiments include a Multiple-Input Signature Register (MISR) as illustrated in FIG. 2 and a Single-Input Signature Register (SISR) as illustrated in FIG. 3. The MISR samples multiple data signals from a monitored circuit, while the SISR receives a single data signal. Both the MISR and SISR incorporate a characteristic signature into the signature register architecture.

FIG. 1 and the following discussion are intended to provide a brief, general description of one suitable testing environment 70 in which "at speed" testing of asynchronous signals from circuit to be tested 20 on an integrated circuit (IC) 10 may be implemented. Specifically, FIG. 1 illustrates a testing environment and architecture. Those skilled in the art will appreciate that the testing architecture may be practiced by employing combinations of hardware and software on a wide variety of different types of computer system configurations, including general purpose central processing units (CPU), application specific integrated circuits (ASIC), programmable logic circuits, state machines, network processing units (NPU), and the like.

The integrated circuit (IC) 10 contains a circuit to be tested 20 in communication with a testing device 40 via a stimulus input path 50 and a data output path 60. The integrated circuit 10 also includes self-test circuitry including a data path 30 between the circuit to be tested 20 and a Multiple-Input Signature Register (MISR) 100. The MISR 100 having a data input path coupled to the data output path 30 of the circuit 20 and a data output path 60 for transmitting output signatures generated by the MISR 100 to the testing device 40.

In one embodiment, the testing device 40 is an external testing device that monitors the data output path of the MISR 100 and compares the detected output signals against a database of expected responses of the circuit. Depending on the output signal generated by the MISR 100, the testing device 40 can classify the functionality of the integrated circuit 10.

The testing device 40 is typically physically separate or "off chip" from the integrated circuit 10, while the MISR 100 is integrated into the circuitry and may be part of a boundary scan controller interface. The boundary scan controller interface is useful for testing individual devices on an IC 10, without the need to remove or isolate individual chipset devices on the IC 10. In one embodiment, this testing or verification is accomplished using a boundary scan, whereby the state of each pin of each device is scanned out from the device being tested. Multiple devices can be daisy chained, and an entire circuit 20 can therefore be scanned in a single scan chain and the responses sent to the testing device 40.

In one embodiment, the testing device 40 includes a database containing signatures, which represent compressed circuit responses. These signatures may be categorized according to the input stimulus, timing, performance, or failure mode. The contents of the database are compared with signatures received from the MISR 100 to determine how the circuit is operating. The database signatures may also enable the testing device 40 to determine the stimulus necessary to generate a particular received bit pattern from a circuit 20. As such, the MISR 100 is reconfigured as a linear feedback shift register (LFSR) and receives the stimulus from the testing device 40 to generate pseudo-random patterns associated with the timing or failure-types to be tested.

In one embodiment the MISR 100 is used to generate stimulus signals for testing the chipset. Data read and data write signals are used to determine where the output signature from the MISR should be sent. For example, during a data read phase, the MISR is configured as a linear feedback shift register (LFSR) and generates the stimulus signals as pseudo-random bit patterns that may be stored in a temporary external memory or applied directly to the circuit being tested. Similarly, during the data write phase, the MISR 100 receives the circuit responses to the stimulus and compresses them into the output signature.

FIG. 2 illustrates one embodiment of a MISR 100 that receives asynchronous data signal lines 110–118, an enable line 120, and a clock signal line 130. The MISR 100 compresses the incoming data signal lines 110–118 according to a characteristic signature of the MISR 100. The characteristic signature of the MISR is configured according to the configuration of feedback lines 150. The compressed responses or output signature are delivered from the MISR 100 via a data output path including signature signal lines 160–168.

Within the MISR 100, one embodiment uses multiple signature register latches 140–148 (SRL 0–SRL 4) to hold bits of the signature. Upon receiving an enable signal and the appropriate clock signal, the signature is shifted out of the latch 140–148 and becomes the output signature. In addition to transmitting the output signature via the signature signal lines 160–168, a portion of the output signature 168 is also combined with the new inputs on the asynchronous data signal lines 110–118 according to a characteristic reflection of the signature to create the new signature. The appropriate "triggering" clock signal is typically a desired clock signal event, such as detecting a clock edge and/or a desired clock level, but may also be characterized as a counter or other similar timing device. The characteristic reflection, as used herein, is the result of applying the characteristic signature to the signature remainder. Thus, the characteristic reflection is the combination of signals carried by the feedback lines 150 back to the individual signal summers/adders to help form the new signature remainder.

The feedback lines 150 are programmed as illustrated based in part on a desired primitive polynomial. The primitive polynomial gives the foundation to the characteristic signature of the MISR 100. The characteristic signature divides the polynomial $1+x^k$ for all values of $k=2^n$, but not for polynomials with a smaller k. As such the combination of the characteristic signature of the MISR with the data received on the data signal lines 110–118 will produce a unique output signature, which is a compressed representation of the received data signals. Once the MISR 100 is enabled, each clock signal generates a new output signature. The new output signature modifies the previous output signature using a combination of received input signals 110–118 and signals from the feedback lines 150. The outputs of the signature registers 140–148, which store the output signature are coupled with the signature signal lines 160–168. The signature signal lines 160–168 form a data output path to deliver the signature from the MISR 100.

Other characteristic signatures can be created using alternative feedback line configurations arranged using a variety of other known primitive polynomials. While FIG. 2 only illustrates two feedback lines 150, several other signature configurations are also acceptable and within the scope of at least one embodiment of the invention. For example, the feedback lines could also be configured to implement other primitive polynomials. Use of a primitive polynomial to configure the feedback lines 150 produces predictable pseudo-random bit patterns in the form of an output signature and minimizes the chance of aliasing, where aliasing refers to an erroneous circuit response happens to generate a signature with the same final signature as the golden signature. The output signature is thus a compressed version of the received circuit responses. Because the signatures are predictable, a database can store signatures and compare them with the output signature received from the MISR 100.

Those skilled in the art will appreciate that the MISR 100 architecture may be practiced by employing combinations of hardware in a wide variety of different configurations, including expanding or reducing the number of signature register latches, signature signal lines, and asynchronous data signal lines. For example, one embodiment of the MISR 100 could condense the output signature to a single output signature signal line 168. The illustrated embodiment uses five input lines, asynchronous data signal lines 110–118, but could easily be expanded or reduced according to the complexity of the circuit being tested and the size of the test vectors necessary to determine chipset operability.

Additionally, the enable signal used to activate the MISR 100 may be generated in a variety of acceptable ways. For example many designs provide a data valid signal that indicates when the first byte of valid data is available at the output channel. The MISR 100 may receive the valid data signal on the enable line 120 and compress the asynchronous data on the data signal lines 110–118. One embodiment may generate an enable signal that travels with the stimulus through the test circuit so that it experiences the same delays as the data and arrives at the MISR 100 with the data.

FIG. 3 illustrates one embodiment of a single-input signature register (SISR) 300 used to compress responses of a single data signal and to generate an output signature. The SISR 300 receives data line 310, valid or enable line 320, and clock line 330. The next output signature is stored in memory modules or signature register latches 340–348. As with the MISR 100 in FIG. 2, the characteristic signature of the SISR 300 is programmed according to the configuration of feedback signal lines 350. Upon receiving an enable signal with an appropriate clock signal, the output signature is provided on a data output path including signature signal lines 360–368.

The SISR 300 can quickly measure the incoming data, compress the received data responses, and transmit the tested circuit responses. The SISR 300 measures asynchronous data when the enable line 320 receives an appropriate signal to indicate that the data on the data line 310 is valid. Upon receiving the appropriate clock signal on the clock line 330, the output signature is compressed within the SISR 300 according to its characteristic signature. The circuit responses may be transmitted to an external testing device via a data output path that includes signature signal lines 360–368.

As with the MISR 100, the enable signal may be provided in a number of acceptable ways. For example, the circuit may employ an "at speed" testing mode, in which a valid data signal or an enable signal travels parallel with the stimulus data through the circuit. Thus the signal will cross the clock boundaries within the circuit and experience the same delays as the real data.

When enabled, the SISR 300 transmits the output signature, creates a new output signature, and stores the new output signature in the signature registers 340–348 with every clock event. One embodiment modifies the SISR response by enabling the signature signal line 360–368 only after the test mode is finished receiving responses. Thus an enable event, where the enable signal moves from an active state to a disabled state, would trigger the SISR 300 to deliver the last signature stored in the SISR 300. As with the MISR 100, the size of the SISR 300 may also be modified to be larger or smaller according to the complexity of the circuit being tested.

The SISR 300 may also be reconfigured to act as a pseudo-random stimulus generator. In this operational mode, the control codes indicating the desired pseudo-random code are provided on the data line 310 and the desired stimulus is produced on signature signal lines 360–368.

Figure 4:
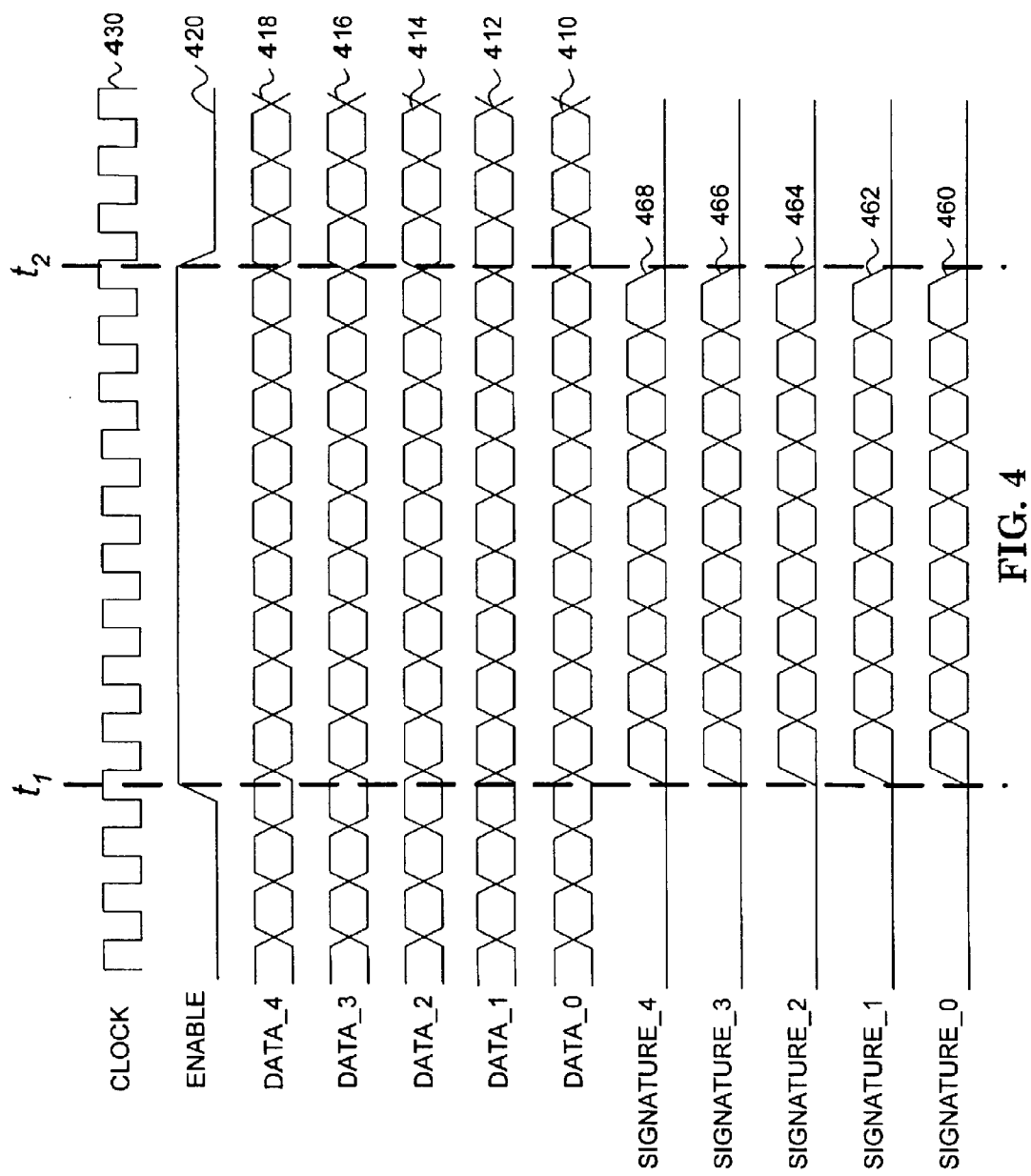
FIG. 4 is a detailed signal-timing diagram of multiple data inputs for one embodiment of a MISR as illustrated in FIG. 2.

FIG. 4 illustrates acceptable input signals for one embodiment of the multiple-input signature register (MISR) 100 used to compress the responses and to generate an output signature. The MISR 100 via data signal lines 110–118 receives asynchronous data signals 410–418. Enable signal line 120 receives the enable signal 420, which indicates when the MISR 100 may accept the arriving data for compression. The clock signal line 130 receives the clock signal 430. The clock signal is generally a multiple of a master clock for the chipset. Upon receiving the enable signal 420 the MISR 100 also generates and delivers an output signature on a data output path via signature signal lines 160–168. The output signature includes output signature signals 460–468.

Time reference, $t_1$, represents the arrival of valid circuit responses at the MISR 100 and the corresponding generation of the output signature. The enable signal 420 is not necessarily synchronized with the clock signal 430. In one embodiment the output signature is generated when the enable signal 420 is valid and the clock signal 430 experiences a time event. Time reference, $t_2$, illustrates a transition of the enable signal 420 from a valid state to an invalid state. In the inactive state the MISR 100 stops generating the output signature and the corresponding output signature signals 460–468.

Figure 5:
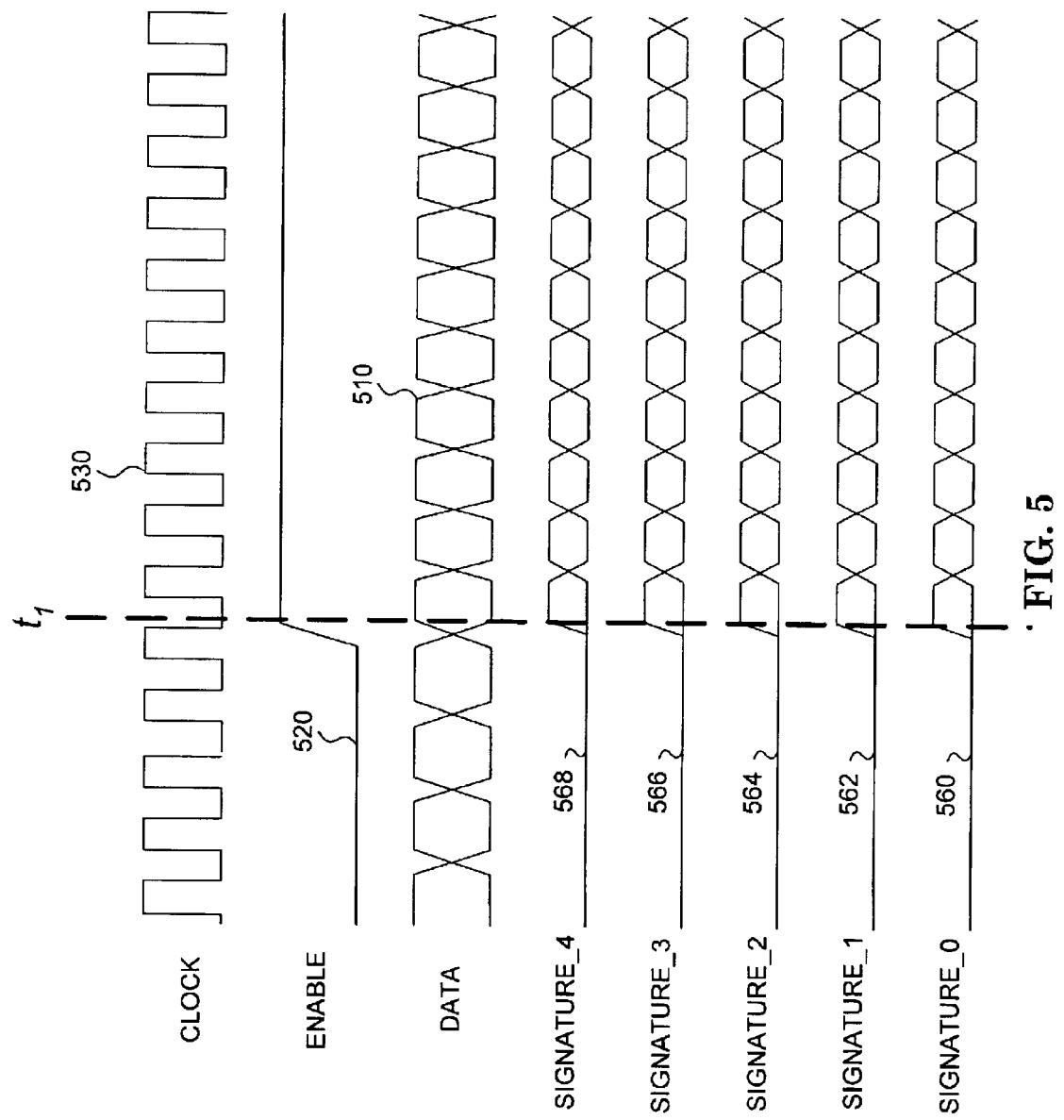
FIG. 5 is a detailed signal-timing diagram of a serial data input for one embodiment of a SISR as illustrated in FIG. 3.

Similarly, FIG. 5 illustrates acceptable input signals for one embodiment of the single-input signature register (SISR) 300 used to compress the responses and to generate an output signature. The SISR 300 receives the asynchronous data signal 510 via data signal line 310. Enable signal line 320 receives the enable signal 520, which indicates when the SISR 300 may accept the arriving data for compression. The clock signal line 330 receives the clock signal 530. Upon receiving the enable signal 520 the SISR 300 also generates and delivers an output signature on a data output path via signature signal lines 360–368. The output signature carries output signature signals 560–568. Time reference, $t_1$, represents the arrival of valid circuit responses at the SISR 300 and the start of output signatures corresponding to the data signal 510. The enable signal 520 need not be synchronized with the clock signal 530. Although, one embodiment of the SISR 300 generates the output signature only after the enable signal 420 is valid and the clock signal 430 experiences a time event. Furthermore, the output signature need not include all of the signature lines 560–568. For example, one embodiment need only receive the output signature signal 568 to reconstruct the circuit responses to stimulus.

Figure 6:
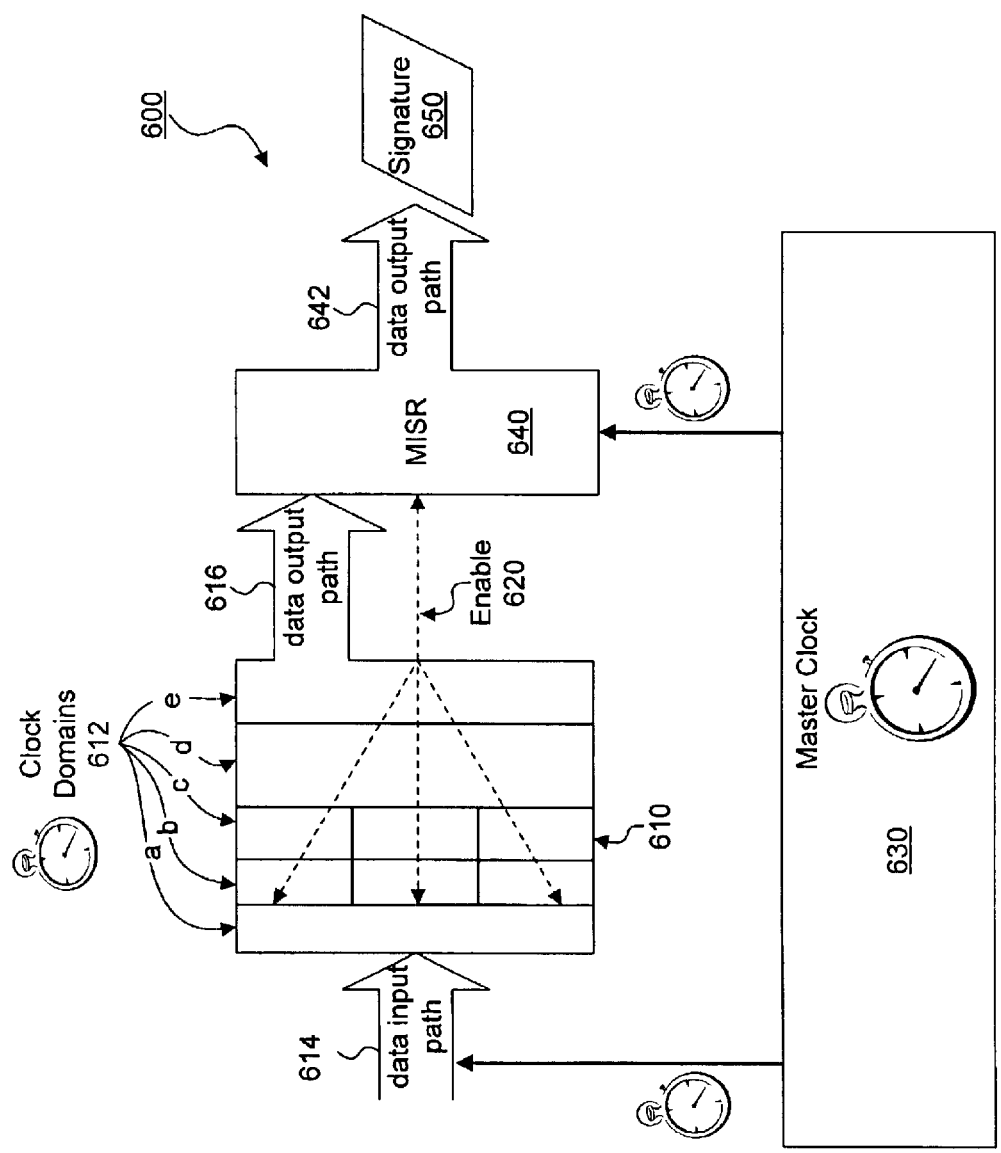
FIG. 6 is a block diagram of exemplary integrated circuit (IC) architecture.

FIG. 6 is a block diagram illustrating a testing environment 600 for a circuit or Circuit to be tested, CBT, 610 with multiple clock domains 612. The chipset 610 having a data input path 614 for receiving stimulus external and a data output path 616 for delivering the chipset responses. Each clock domain 612a–612e may be operating at a different clock speeds, such that the interaction of these clock domains creates cycle uncertainty. Exemplary clock domains include the core of the chipset, the CPU (Central Processing Unit), the PCI Bus, memory, and other component modules operating at different clock speeds from the master clock signal 630 for the device. Clock domain interfaces are often created to handle interfacing delays between the clock domains, such as synchronization delays.

Before data signals may travel between the various clock domains 612a–612e, they must be synchronized with the new clock domain. This synchronization process generally causes the data to gain or lose a clock cycle. As a result, crossing multiple clock boundaries may substantially increase or decrease the relative position of a data signal with respect to the originally transmitted data signal. An additional difficulty is that the latency associated with synchronization varies from chip to chip for the same design and often from test to test. This makes it even more difficult to accurately predict the arrival of valid output data signals at the output data path 616. To compensate for the inherent difficulties in predicting the timing and latency associated with the circuit being tested, one embodiment generates enable signals 620 that travel with the asynchronous data signals through the various clock domains 612. Moreover, those skilled in the art will appreciate that alternative methods of generating the enable signal 620 may be practiced within the scope of at least one embodiment of the invention.

For example, when the chipset requires multiple data channels, one embodiment generates multiple enable signals to accompany the leading edge of valid data signals through each data channel. Each enable signal 620 travels independent of the other enable signals 620 through the chipset 610 to the MISR 640. In this manner, the arrival of one of the enable signals 620 at the MISR 640 indicates that the asynchronous data signals accompanying the arriving enable signal 620 on the data output path 616 are now valid. Depending on the application, the circuit responses from the first data channel will be stored in the MISR 640 and then the second set of responses, which have been queued internally, are delivered to the MISR 640 in their entirety. In contrast, multiple output data channels generally make use of data lock loop on testers difficult.

In another embodiment, the enable signals 620 may alternatively be logically recombined with each other during the test process or prior to transmission to the MISR 640. For example, data using a first data channel may take ten clock cycles to arrive at the data output path 616 to the MISR 640, while data using a second data channel may take fifteen cycles to arrive at the MISR 640. If the original data stimulus is ten cycles long, there will be an overlap of valid data arriving at the MISR 640 from the first and second data channel. In one embodiment, the enable signal 620 accompanying the data traversing the first data channel would activate the MISR 640 after a latency of ten clock cycles and would remain active for about ten clock cycles. The enable signal 620 from the second data channel would combine with the first enable signal 620 after a latency of fifteen clock cycles and remain active for about ten clock cycles. Thus in this example, the MISR 640 would receive circuit responses between about ten clock cycles when the first enable signal 620 arrived until about twenty-five clock cycles when the second enable signal 620 is disabled.

As previously discussed the MISR 640 receives the chipset responses via the data output path 616 and compresses the responses into an output signature 650. Generally, the MISR 640 is operationally synchronized with the master clock 630 so that signals sent from the chipset 610 are coordinated with the MISR 640 clock. The enable signal 620, however; may be asynchronous or synchronized. Alternative embodiments of the MISR 640 include configurations that generate a signature with every clock cycle, but only enable the data output path 642 upon receiving the enable signal 620.

Figure 7:
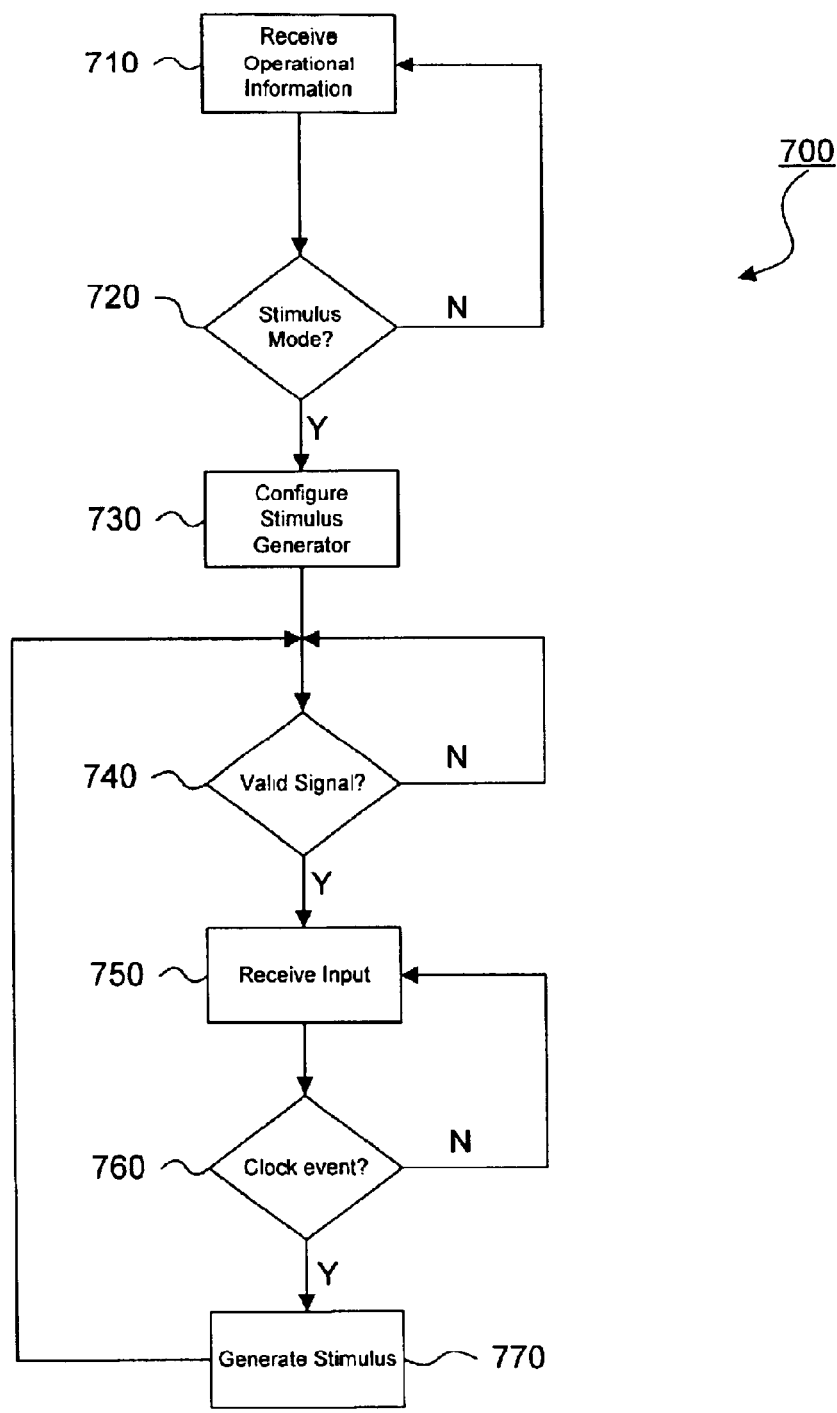
FIG. 7 is a flow chart of an exemplary stimulus generator.
Figure 8:
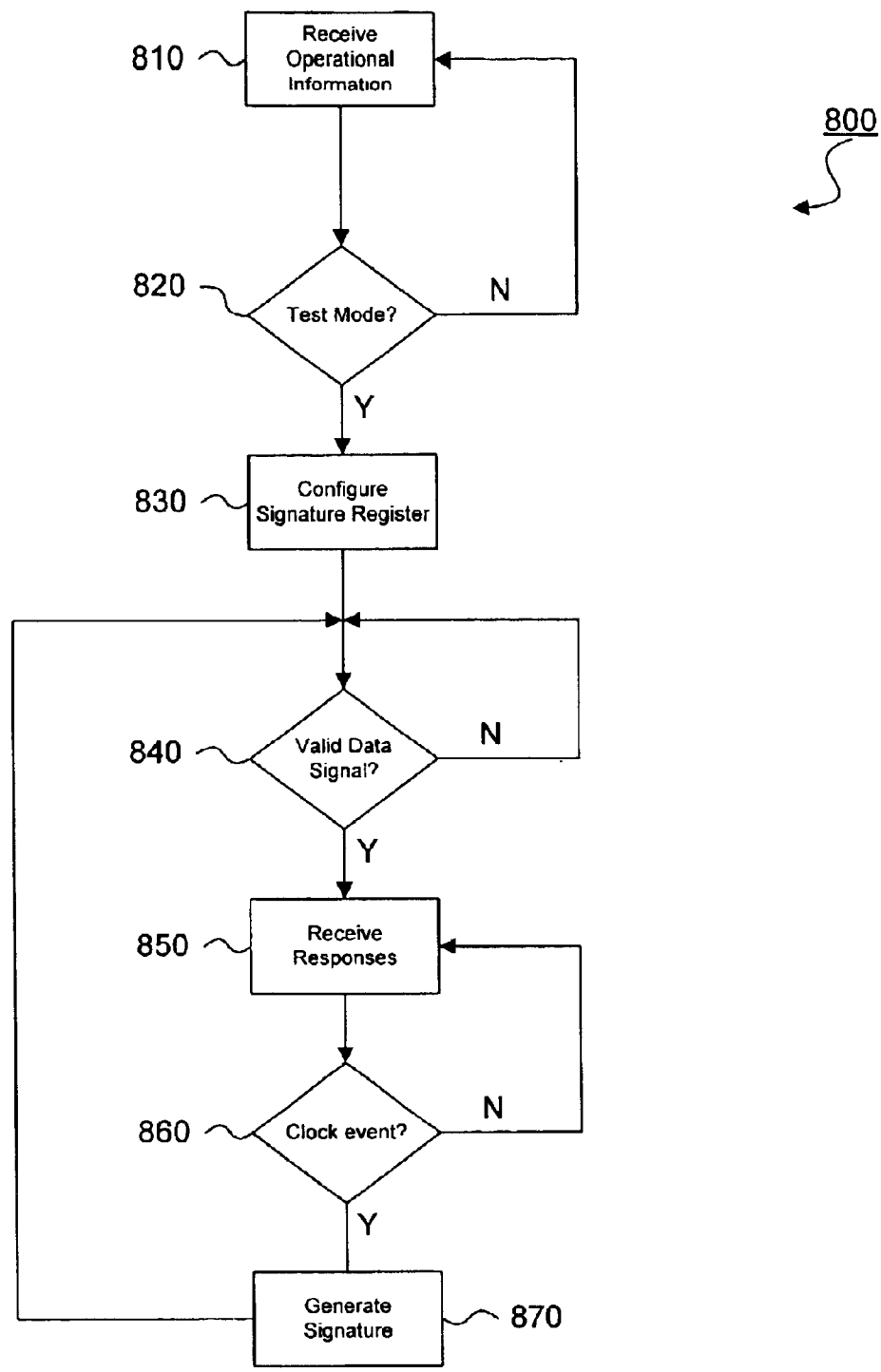
FIG. 8 is a flow chart of an at speed asynchronous testing device.

Turning now to FIGS. 7–8, the particular methods of the invention are described in terms of hardware and software with reference to a series of flowcharts. The methods to be performed by an electronic testing device constitute state machines or computer programs made up of computer-executable instructions. Describing the methods by reference to a flowchart enables one skilled in the art to develop such programs including such instructions to carry out the methods on suitably configured testing devices. For example, the testing device configuring the signature registers, generating stimulus for the circuit being tested, and receiving circuit responses in the form of pseudo-random signatures from the signature registers according to instructions received from computer-accessible media. The computer-executable instructions may be written in a computer programming language or may be embodied in firmware logic. If written in a programming language conforming to a recognized standard, such instructions can be executed on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, process, application . . . ), as taking an action or causing a result. Such expressions are merely a shorthand way of saying that execution of the software by an electronic testing device causes the processor of the device to perform an action or a produce a result.

FIG. 7 illustrates a method or process of generating pseudo-random bit values 700 used as stimulus for a circuit to be tested. Execution block 710 receives operational information including the desired starting signature, characteristic signature, remainder, and operational mode of the device. Query block 720 determines whether the device is in stimulus mode. If not the process returns to execution block 710. If the device is instructed to operate in stimulus mode, execution block 730 configures the stimulus generator to provide the appropriate pseudo-random bit values. For example, a MISR device might be reconfigured as a LFSR (linear feedback shift register) to generate pseudo-random bit patterns that may be stored in a temporary external memory or applied directly to the circuit being tested. Generation of the pseudo-random bit patterns is controlled via query block 740, which checks for a valid data signal. If a valid signal is not detected, the process waits until a valid signal is detected. Once detected, the valid signal enables execution block 750 to receive inputs that will help to generate the desired pseudo-random bit patterns. Upon a desired clock event, query block 760 activates execution block 770 to generate the desired stimulus. Stimulus may be stored in a temporary external memory or applied directly to the circuit or chipset being tested. Upon generation of stimulus, the stimulus generation process returns to query block 740.

FIG. 8 illustrates a method of at speed testing of asynchronous signals 800. Upon receiving the operational information 810, which includes configuration settings and operational modes, the process 800 determines whether test mode has been authorized 820. Once test mode has been selected, the process configures the signature registers 830, which will hold the compressed responses of the circuit being tested. This configuration process may be accomplished by loading a set of values into the signature registers or by resetting the signature registers according to a characteristic signature for the testing device. Generally, the first output signature is a combination of the old output signature retrieved from the signature registers, data received during the configuration process, and the feedback signals provided according to the characteristic signature. Subsequent output signatures combine the old output signature, received asynchronous data, and the feedback signals. Upon determining whether the data signal being received is valid 840, the process enables the device to receive the circuit responses 850 and combines them with the stored characteristic signature to create a new output signature. Upon receiving a desired clock event 860, the process generates the output signature for the data output path. Once an output signature is generated the process returns to determine if another signature will be generated 840.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An apparatus comprising:
a circuit comprising a data output path, a valid data signal line, and a clock source; and
multiple input signature registers (MISR) comprising a data input path coupled to the data output path of the circuit, a data output path for transmitting an output signal generated by the MISR in response to a enable line, and a clock line coupled to the clock source of the circuit.

2. The apparatus of claim 1, wherein transmitting from the MISR on the data output path further comprises transmitting the output signal across a chip boundary.

3. The apparatus of claim 1, wherein the MISR enable line receives a valid data signal from the circuit valid data signal line prior to generating the output signal.

4. The apparatus of claim 1, further comprising a tester to receive the output signal, the tester being configured to determine whether the received output signal matches an expected output signal.

5. The apparatus of claim 4, wherein the output signal is a pseudo-random signature.

6. The apparatus of claim 4, wherein the expected output signal is at least one of a plurality of known good signatures.

7. The apparatus of claim 4, wherein the tester receives all of the output signals from the MISR at a normal operational speed to determine whether the circuit is functioning properly.

8. The apparatus of claim 1, wherein the data input path is configured to receive asynchronous data signals.

9. The apparatus of claim 8, wherein the circuit further comprises a plurality of clock boundaries in the data path to generate the asynchronous data signals.

10. The apparatus of claim 9, wherein each of the plurality of clock boundaries potentially change the relative position of a leading edge of valid data.

11. A system comprising:
a chipset comprising multiple clock domain interfaces and a data output path, the chipset generating at least one clock signal and an asynchronous data signal; and
an input signature register (ISR) coupled to the data output path and receiving the asynchronous data signal and the at least one clock signal, the ISR having a data output path for transmitting predictable outputs available after a first time period that is longer than a second time period of uncertainty caused by the multiple clock domain interfaces.

12. The system in claim 11, the system further comprising a tester coupled to the data output path, the tester determining whether the predictable outputs match desired outputs.

13. The system in claim 12, wherein the tester provides stimulus signals to direct the chipset to generate the asynchronous data signal.

14. The system in claim 11, wherein the data output path comprises a single data signal line and an enable data signal line, the ISR comprises a single input signature register (SISR).

15. The system in claim 11, wherein the data output path comprises a plurality of data signal lines and the ISR comprises multiple input signature registers (MISR).

16. The system in claim 11, wherein the chipset generates a valid data signal and upon receiving the valid data signal the ISR generates the predictable outputs.

17. The system in claim 16, wherein the predictable outputs are pseudo-random signatures.

18. The system in claim 11, wherein the predictable outputs indicate whether the chipset is functioning properly at a given operational clock speed.

19. The system in claim 11, wherein the data output path further comprises an enable signal line.

20. A method comprising:
generating asynchronous data signals within a circuit operating at speed;
upon receiving a valid data write signal from the circuit, receiving the asynchronous data signals at multiple input signature registers (MISR); and
generating an output signature.

21. The method of claim 20, wherein generating the output signature comprises generating predictable output signatures in the MISR to read after a period of cycles that is longer than a period of signal uncertainty.

22. The method of claim 20, wherein the output signature is a predictable pseudo-random signature.

23. The method of claim 20, wherein generating asynchronous data signals further comprises generating pseudo-random signals to test a specific portion of the circuit.

24. The method of claim 20, wherein receiving a valid data write signal comprises receiving an enable signal.

25. The method of claim 24, wherein receiving a valid data write signal further comprises detecting a desired clock signal event.

26. The method of claim 20, further comprising determining whether the circuit is operating correctly by comparing the output signature with expected signatures.

27. The method of claim 20, further comprising comparing the output signature to a plurality of anticipated signatures to determine inoperable components.

28. The method of claim 20, further comprising configuring the MISR as a linear feedback shift register (LFSR) upon receiving a valid data read signal and transmitting the output signature.

29. The method of claim 20, further comprising inputting signals into the circuit.

30. The method of claim 29, further comprising generating a valid data write signal and coordinating transmission of the valid data write signal to the MISR with a leading edge of valid asynchronous data signals generated by the circuit.

31. A data signal embodied in a data communications medium shared among a plurality of electronic systems, the data signal transmitting content that, when accessed, cause one or more electronic systems to:

generate a valid data signal that indicates when the first byte of valid data is available at an output channel of the one or more electronic systems;

receive valid data from the output channel into multiple input signature registers (MISR) enabled by the valid data signal; and generate predictable outputs at the MISR following a first period of cycles that is longer than an second period of uncertainty caused by multiple clock domain interfaces.

32. The data signal of claim 31, wherein the predictable outputs are received by a tester upon receiving a data read signal.

33. The data signal of claim 31, wherein the MISR is configured as a linear feedback shift register to generate predictable pseudo-random output patterns upon receiving a data read signal.

34. The data signal of claim 31, further causing the one or more electronic systems to compare the predictable outputs from the MISR with valid operational signatures to determine if the one or more electronic systems are operating correctly.

35. The data signal of claim 31, wherein the valid data is an asynchronous data signal.

* * * * *